Dec. 13, 1949  E. H. ZAHN  2,491,147
METHOD OF MAKING DENTURE BASE PARTS AND
APPLYING ARTIFICIAL TEETH THERETO
Filed Nov. 22, 1946
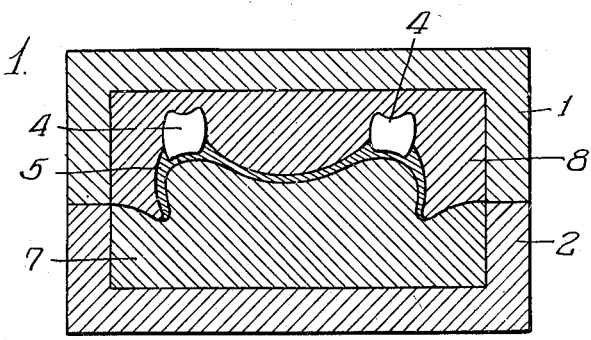
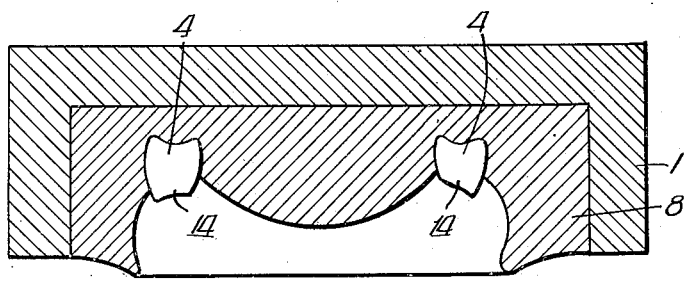
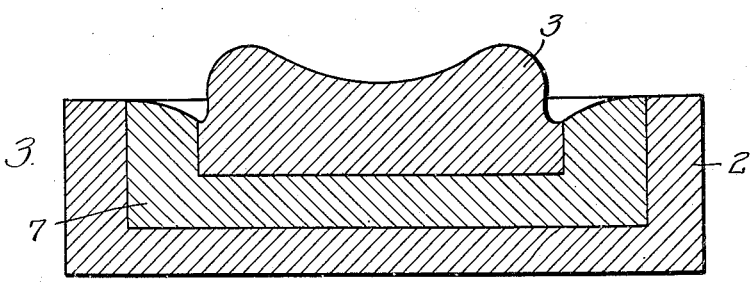
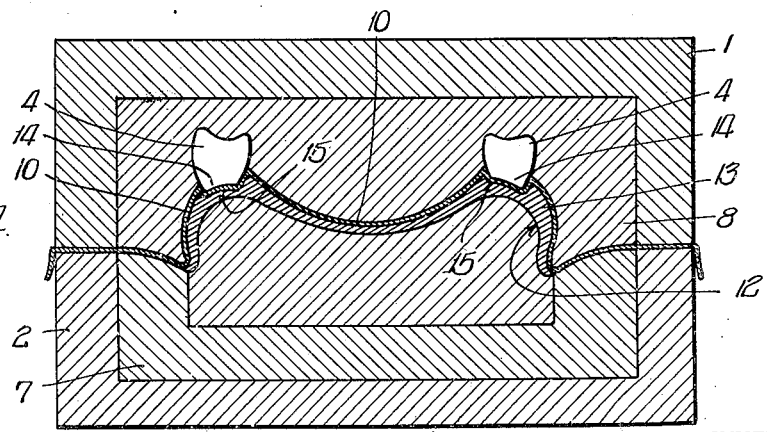
INVENTOR.
Eric H. Zahn,
BY Patented Dec. 13, 1949

2,491,147

UNITED STATES PATENT OFFICE 2,491,147

METHOD OF MAKING DENTURE BASE PARTS AND APPLYING ARTIFICIAL TEETH THERETO

Eric H. Zahn, Kirkland, Wash., assignor to Austenal Laboratories, Incorporated, New York, N. Y., a corporation of New York Application November 22, 1946, Serial No. 711,746

7 Claims. (Cl. 18—55.1)

1

This invention relates, in general, to the art of making denture base parts and applying artificial teeth thereto, and has particular relation to an improved method of making denture base parts and applying synthetic resin-like teeth thereto.

The present practice of molding resin dentures is well known in the art. In general, after the stone models are mounted on articulators with the help of a bite for establishing the correct relationship between the upper and lower model parts, the teeth are set up in wax. The wax denture patterns are modeled as closely as possible to the desired shape and outline of the resin denture. After completion of waxing, the waxed model, with the teeth thereon, is embedded in plaster or the like in a dental flask. After investing, the flask is opened and the wax is eliminated, for example, by boiling, leaving the teeth firmly embedded on one side of the flask.

In the void created by elimination of the wax, uncured resin is either injected or forced into place by pressing the two halves of the flask together. The resin denture is then cured. This is usually done in a water bath. After completion of the cure, the case is deflasked and finished.

In general, the foregoing technique has been in use ever since the vulcanite denture was invented, and, of course, is applicable to all types of denture materials, such as vulcanite, the phenolic resins, acrylic denture materials, and the like.

Where porcelain teeth have been involved, finishing of the denture base part has been no problem. However, with the increasing popularity of plastic or synthetic resin-like teeth, the finishing of the denture, and particularly the denture base part, has become a difficult practical problem. Even with extremely careful waxing around the interproximal spaces, damage to the relatively soft plastic or synthetic resin-like teeth is unavoidable, and in many dentures with plastic or synthetic resin-like teeth the labial detail of the teeth has been completely obliterated due to overfinishing.

One of the main objects of the present invention is to provide an improved method with which the problems heretofore encountered in finishing dentures having plastic or synthetic resin-like teeth are eliminated, and a method with which the denture, and particularly the denture base part, may be finished, as desired, without harm or damage to the relatively soft plastic or synthetic resin-like teeth.

Another object of the invention is to accomplish the new and advantageous results set forth by applying a thin separating medium over a portion, and particularly over the gingival portion of the tooth, molding the denture base part against the portion of the tooth to which the separating medium is applied, removing the tooth from the socket formed in the denture base part to permit finishing the denture base part as desired without harm or damage to the tooth, and thereafter securing, for example, by suitable cement, the gingival portion of the tooth in its socket in the denture base part.

Another object of the invention is to provide a method of the character described having the novelty and advantages set forth and characterized by its simplicity and its economy and effectiveness in use for accomplishing the desired results.

Further objects and advantages of the invention will appear from the following detailed description, taken in connection with the accompanying drawing in which:

Figure 1 is a more or less diagrammatic vertical sectional view showing a waxed model with teeth set up in the wax, and the waxed model with the teeth thereon embedded in plaster-like material in the two halves of a dental flask;

Figure 2 is a similar view of the upper half of the dental flask in position opened or separated from the lower half of the flask, and showing the thin separating medium applied over the upper flask after the wax is eliminated;

Figure 3 is a similar view of the lower half of the dental flask; and

Figure 4 is a vertical sectional view of the mold showing the denture base part molded in the void created by the elimination of the wax and against the portions of the teeth over which the separating medium is applied.

Referring first to Figure 1 of the drawing, the reference numerals 1 and 2 designate, generally, the upper and lower flask halves, respectively, of a dental mold. In forming a dental plate or denture or denture part, an impression of the mouth is first taken, and from this negative a model 3 of stone or the like is formed.

After the models are mounted, for example, on articulators with the help of a bite for establishing the correct relationship between the upper and lower model parts, the teeth 4—which are preferably formed of plastic or synthetic resin-like material—are set up in wax 5. The wax patterns 5 are modeled as closely as possible to the desired shape and outline of the resin denture. After completion of the waxing 5 and setting up of the teeth 4, the denture is embedded in plaster or plaster-like material in the lower flask half 2, at 7, and in the upper flask half 1, at 8.

After the waxed model, with the teeth 4 set up as shown, is invested, the flask is opened and the wax 5 is eliminated, for example, by boiling, leaving the teeth 4 firmly embedded in the investment 8 in the upper flask half 1'.

After the wax 5 has been eliminated and with the flask opened as shown in Figures 2 and 3, a thin separating medium 10 is applied over the projecting gingival portions of the teeth 4. In Figure 4 this separating medium 10 is shown in the form of a thin rubber, rubber-like, or freely stretchable membrane stretched over the lower portion of the upper flask 1. When the flask is closed by positioning the upper flask half 1 on the lower flask half 2, the separating medium 10 stretches and follows the surfaces 11 of the model 3.

With the flask half 1 on the flask half 2, as shown in Figure 4, uncured acrylic material or any other suitable or desired uncured plastic or synthetic resin-like material is injected or otherwise introduced into place in the void created by elimination of the wax, or the synthetic resin-like material may be forced into place by pressing the two flask halves together. In filling the void or cavity 12, the plastic or synthetic resin-like material, indicated at 13 in Figure 4, fills in against the gingival portions 14 of the teeth 4, with the separating medium 10 therebetween.

After injection or pressing of the uncured acrylic or other plastic or synthetic resin-like material 13 into the flask cavity 12, the denture base part formed by the material 13 is cured. This may be done according to common practice usually in a water bath, but it is to be understood that the denture base part may be cured in any other suitable manner.

The thin rubber, rubber-like, freely stretchable or other separating medium as will hereinafter appear, prevents fusion of the plastic or synthetic resin-like teeth 4 to the acrylic or other plastic or synthetic resin-like denture base material 13. In other words, the separating medium 10 maintains the gingival portions 14 of the teeth 4 free of the denture base part to permit removal of the teeth 4 from the denture base part after molding thereof. This permits finishing the denture base part without harming or damaging the teeth 4.

The case is then deflasked, and with the case cured and deflasked the teeth 4 are removed from their sockets 15 in the denture base part. The denture base part is then finished and polished as desired. This is easily accomplished since the plastic or synthetic resin-like teeth 4 do not interfere with the finishing of the denture base part, particularly around the gingival margins.

Separating media 10, other than the rubber, rubber-like or freely stretchable membrane previously described, are contemplated within the scope of the present invention. Thin films of polyvinyl alcohol or poly-ethylene have been tried and found suitable as the separating medium 10. I also contemplate electroplating the protruding portions of the plastic or synthetic resin-like teeth 4, and spraying of a thin film of metal, using a metal spray gun, over the prortruding or gingival portions of the teeth 4 to provide the desired separating medium 10.

Where the separating medium 10 is in the form of a rubber, rubber-like or freely stretchable membrane, the preferred thickness of this membrane is around .003" in an unstretched condition. I prefer to tightly stretch the rubber over the flask so that the thickness of the rubber or rubber-like material is reduced to about one-third of its original thickness. This minimizes the space between the plastic or synthetic resin-like teeth and the denture base part, so that, when the teeth are cemented in their sockets in the denture base part, a strong bond is produced notwithstanding shrinkage of the cement used for securing the teeth in their sockets.

After the denture has been finished and polished, the plastic or synthetic resin-like teeth 4 are cemented in their sockets 15 in the denture base part. This may be done with the help of a plaster matrix. Various cements have been used; a mixture of methyl-methacrylate monomer and polymer having given particularly satisfactory results. The proportion is 90% monomer to 10% polymer. Other cements which have been tried and found suitable are glacial acetic acid; and a cement with the trade name "Penacolite" which is believed to be a phenolic type of condensation resin. The use of any of the well-known dental cements is also contemplated within the scope of the present invention.

As a further modification of the technique of using a membrane of yieldable or freely stretchable material in order to prevent fusion of the plastic or synthetic resin-like teeth to the acrylic or synthetic resin-like denture base part, a different approach is also contemplated. This comprises coating of the part of the tooth protruding into the cavity for the acrylic or other plastic or synthetic resin-like material, with a material which will prevent curing of the resin teeth to the denture base part. Materials which have been tried and found suitable for this purpose are polyvinyl alcohol in liquid form and high fusing waxes which may be either sprayed or painted on to the desired, and particularly the gingival portions of the teeth, or the waxes may be used in liquid form dissolved in a suitable solvent.

The embodiments of the invention shown and described are for illustrative purposes only, and it is to be expressly understood that the drawing and the accompanying specification are not to be construed as a definition of the limits or scope of the invention, reference being had to the appended claims for that purpose.

I claim:

1. The method of making a denture base part and applying a tooth thereto, which comprises molding the denture base part around the gingival portion of the tooth to form in the denture base part a socket conforming to the gingival portion of the tooth, removing the tooth from the socket in the denture base part to permit finishing the denture base part without harming the tooth, and thereafter inserting the gingival portion of the tooth in said socket from which it was removed and securing said gingival portion of the tooth in said socket.

2. The method of making a denture base part and applying a tooth thereto, which comprises applying a thin separating medium over the gingival portion of the tooth, molding the denture base part around the gingival portion of the tooth to which the separating medium is applied to form in the denture base part a socket conforming to the gingival portion of the tooth, removing the tooth from the socket in the denture base part to permit finishing the denture base part without harming the tooth, and thereafter inserting the gingival portion of the tooth in said socket from which it was removed and securing said gingival portion of the tooth in said socket.

3. The method of making a denture base part and applying a resinous tooth thereto, which comprises applying a thin separating medium over the gingival portion of the tooth, molding the denture base part around the gingival portion of the tooth to which the separating medium is applied to form in the denture base part a socket conforming to the gingival portion of the tooth, removing the tooth from the socket in the denture base part to permit finishing the denture base part without harming the tooth, and thereafter inserting the gingival portion of the tooth in said socket from which it was removed and cementing said gingival portion of the tooth in said socket.

4. The method of making a denture base part and applying a tooth thereto, which comprises molding the denture base part around a portion of the tooth to form on the denture base part positioning means for the tooth, removing the tooth from the denture base part to permit finishing the denture base part without harming the tooth, and thereafter applying the tooth to the denture base part in cooperation with said positioning means and in the place where the tooth was when the denture base part was molded, and securing the tooth to the denture base part in said position.

5. The method of making a denture base part and applying a tooth thereto, which comprises applying a thin separating medium over the gingival portion of the tooth, molding the denture base part around the gingival portion of the tooth to which the separating medium is applied to form in the denture base part a socket conforming to the gingival portion of the tooth, removing the tooth from the socket in the denture base part to permit finishing the denture base part without harming the tooth, removing the thin separating medium, and thereafter inserting the gingival portion of the tooth in said socket from which it was removed and securing said gingival portion of the tooth in said socket.

6. The method of making a denture base part and applying a resinous tooth thereto, which comprises applying over the gingival portion of the tooth a thin separating medium consisting of a thin rubber-like membrane, molding the denture base part around the gingival portion of the tooth to which the separating medium is applied to form in the denture base part a socket conforming to the gingival portion of the tooth, removing the tooth from the socket in the denture base part to permit finishing the denture base part without harming the tooth, and thereafter inserting the gingival portion of the tooth in said socket from which it was removed and securing said gingival portion of the tooth in said socket.

7. The method of making artificial parts and fitting them together, which comprises molding a first part around a portion of a second part to form on the first part positioning means for said second part, removing the second part from said first part while said first part is at a temperature which will not permit deforming the same, finishing said first part while said second part is removed so as not to harm said second part, and thereafter applying said second part to said first part in cooperation with said positioning means and in the place where the second part was when the first part was molded and securing the second part to the first part in said position.

ERIC H. ZAHN.

REFERENCES CITED

The following references are of record in the file of this patent:

UNITED STATES PATENTS

| Number | Name | Date |
| --- | --- | --- |
| 1,742,430 | Wardell | Jan. 7, 1930 |
| 2,057,341 | Morgan | Oct. 13, 1936 |
| 2,369,758 | Sheldon | Feb. 20, 1945 |
| 2,380,468 | Saffir | July 31, 1945 |
| 2,402,259 | Saffir | June 18, 1946 |
| 2,409,783 | Moskey | Oct. 22, 1946 |
| 2,428,094 | Raymond | Sept. 30, 1947 |